US008428300B2

(12) United States Patent
Pohjola et al.

(10) Patent No.: US 8,428,300 B2
(45) Date of Patent: Apr. 23, 2013

(54) METHOD FOR SECURING AN IMAGE BY MEANS OF GRAPHICAL ANTI-COUNTERFEITING MEANS, METHOD FOR SECURING AN IDENTIFICATION DOCUMENT, AND SECURE IDENTIFICATION DOCUMENT

(75) Inventors: Teemu Pohjola, Meudon Cedex (FR); Christophe Mourtel, Meudon Cedex (FR); Frédéric Ros, Meudon Cedex (FR)

(73) Assignees: Gemalto SA, Meudon Cedex (FR); Gemalto Oy, Vantaa (FI)

( * ) Notice: Subject to any disclaimer, the term of this patent is extended or adjusted under 35 U.S.C. 154(b) by 242 days.

(21) Appl. No.: 13/002,919

(22) PCT Filed: Jul. 7, 2009

(86) PCT No.: PCT/EP2009/058595

§ 371 (c)(1), (2), (4) Date: Mar. 7, 2011

(87) PCT Pub. No.: WO2010/003948

PCT Pub. Date: Jan. 14, 2010

(65) Prior Publication Data

US 2011/0158472 A1 Jun. 30, 2011

(30) Foreign Application Priority Data

Jul. 7, 2008 (EP) .................................... 08290666

(51) Int. Cl.
*G06K 9/00* (2006.01)
*A42B 1/00* (2006.01)

(52) U.S. Cl.
USPC ............................ 382/100; 382/290; 380/201

(58) Field of Classification Search .................. 382/100, 382/103, 112–116, 135–139, 155, 162, 168, 382/181–189, 193–194, 199, 219, 232, 254, 382/274, 276, 290, 292, 305, 312; 358/3.16; 380/28, 201; 713/176
See application file for complete search history.

(56) References Cited

U.S. PATENT DOCUMENTS 6,222,932 B1 * 4/2001 Rao et al. ...................... 382/100
7,194,105 B2 * 3/2007 Hersch et al. ................. 382/100
(Continued)

FOREIGN PATENT DOCUMENTS

EP 1 407 896 A1 4/2004
GB 2 289 016 A 11/1995
WO 00/24589 A1 5/2000
WO 2004/079655 A2 9/2004

OTHER PUBLICATIONS

Int'l Search Report issued on Nov. 2, 2009 in Int'l Application No. PCT/EP2009/058595.

(Continued)

*Primary Examiner* — Seyed Azarian
(74) *Attorney, Agent, or Firm* — Panitch Schwarze Belisario & Nadel LLP

(57) ABSTRACT

The invention relates to a method for securing a first image by means of graphical anti-counterfeiting means and to a method for securing an identification document with such graphical anti-counterfeiting means. The invention also relates to a secure identification document that allows detecting either a fraudulent modification of the existing personalization or a fraudulent falsified document. For that, graphical anti-counterfeiting image is inserted into an identification image, each image being defined by a plurality of pixels. The characteristic level (for example grey level) of each pixel i of the graphical anti-counterfeiting image is linked, by a function F, to a matrix Ωi of pixels defined in the identification image, said pixels of the matrix Ωi surrounding the location i of a pixel of the graphical anti-counterfeiting image, said function F taking into account the characteristic level (for example average grey level) G(Ωi) and the texture level T(Ωi) of said matrix Ωi.

5 Claims, 5 Drawing Sheets

U.S. PATENT DOCUMENTS

| | | | | |
|---|---|---|---|---|
| 7,196,822 | B2 * | 3/2007 | Hu | 358/3.16 |
| 7,197,644 | B2 * | 3/2007 | Brewington | 713/176 |
| 8,055,013 | B2 * | 11/2011 | Levy et al. | 382/100 |
| 2004/0096058 | A1 * | 5/2004 | Cho et al. | 380/28 |
| 2005/0117776 | A1 | 6/2005 | Powell et al. | |
| 2006/0055170 | A1 | 3/2006 | Luthi | |

OTHER PUBLICATIONS

Written Opinion issued on Nov. 2, 2009 in Int'l Application No. PCT/EP2009/058595.

EP Search Report issued on Nov. 26, 2008 in EP Application No. 08 29 0666.

* cited by examiner

METHOD FOR SECURING AN IMAGE BY MEANS OF GRAPHICAL ANTI-COUNTERFEITING MEANS, METHOD FOR SECURING AN IDENTIFICATION DOCUMENT, AND SECURE IDENTIFICATION DOCUMENT

CROSS-REFERENCE TO RELATED APPLICATION

This application is a Section 371 of International Application No. PCT/EP2009/058595, filed Jul. 7, 2009, which was published in the English language on Jan. 14, 2010, under International Publication No. WO 2010/003948 A1, and the disclosure of which is incorporated herein by reference.

BACKGROUND

This invention relates generally to identification documents and a method for making such identification documents. More particularly, this invention relates to a method for securing an image by means of graphical anti-counterfeiting means and to a method for securing an identification document with such graphical anti-counterfeiting means. The invention also relates to a secure identification document that allows detecting either a fraudulent modification of the existing personalization or a fraudulent falsified document.

Identification documents, with or without chip, such as driving licenses, identity cards, membership cards, badges or passes, passports, discount cards, banking cards, money cards, multi-application cards, and other papers of value; and security documents such as bank notes are widely used. Because of the value and importance associated with each of these data carriers, they are often the subject of unauthorized copying and alterations, and forgeries.

To prevent such activities from being carried out on these data carriers, different types of visual and touchable security features have been added to data carriers. One of these security features is a pattern, which is made with wavy lines that draw pre-determined motifs. Such pattern is superimposed on the personalization data, for example photography, and is commonly known under the name "guilloches". FIG. 1 show an illustration of such a guilloche pattern 10 superimposed onto the photography 12 of the owner of an identification document.

However, the shape of such pattern is predictable because the same on all the documents of one batch. Consequently, it is very easy for infringers to scan the pattern and to reproduce it on a blank document on which a fraudulent photograph has been printed, in order to manufacture completely falsified documents.

To prevent such counterfeiting, one solution consists in taking into account the personalized data of the owner to define a personalized pattern for each document. However, with such a solution, the policemen can no more do a first verification by simple visual inspection, and they have to rely on a separate dedicated reader device. Consequently, such a solution is time and cost consuming.

Another solution to prevent counterfeiting consists in computing the grey level of the original image, at the location of the targeted guilloche pixel, in order to reverse the luminosity of this guilloche pixel compared to the original image so that the guilloche pixel becomes perceptible to naked eye. FIG. 2 shows a schematic guilloche line 110 inserted into part of an image 100, in which the luminosity of target pixels 111, 112, 113 has been changed to form the guilloche line 110. In this figure, the guilloche line uses a grey scale that contrast highly with the background. For example, the guilloche pixels appear clear 111 on a dark area 101 of the picture, and dark 112, 113 on a clear area 102, 103 of the picture. However, this approach does not protect blank documents against illicit personalization as there is no way, with or without reader, to detect whether the security pattern (guilloche) was generated using the correct algorithms and has the correct grey level. In fact, an infringer can scan the guilloche pattern and apply it on a fraudulent image by reversing the luminosity of the target guilloche pixel. Furthermore, even if the guilloche pattern is now perceptible and resistant to image degradation, the contrast may be too high and it can affect the image perception because it does not take into account the Human Visual System. The Human Visual System is defined as the way people perceive images, i.e. the process involving not only the eye but also the image processing parts of the brain.

Considering the above, the invention aims to improve the existing prior art solutions by enabling a first visual inspection of only one predictable pattern shape, a reader based detection of illicit personalization, and by using knowledge of Human visual system to improve the visual perception of the inserted security pattern.

Thus, a first technical problem intended to be solved by the invention is to provide a method for securing a first image by a security pattern image overlapping the first one, wherein each image is defined by a plurality of pixels, said method enabling to insert security pattern by using knowledge of human visual system in order not to alter the visual perception of the first image, to use only one predictable security pattern so that a first visual verification remains possible, and to detect an illicit personalization by means of a dedicated reader.

A second technical problem intended to be solved by the invention is to secure an identification document holding an identification image by inserting a security pattern image into the identification image, said method preventing a subsequent fraudulent modification of the personalization to be made, which is easy to detect by using a dedicated reader, and preventing the manufacturing of a completely falsified identification document.

Another technical problem intended to be solved by the invention is to provide a method for verifying the authenticity of an image secured by means of a security pattern image inserted into it, said method enabling to detect all types of fraud, either a completely falsified image or an image having been subsequently modified.

SUMMARY

The solution of the invention to the first problem relates to the fact that the method comprises the following steps:

- defining a matrix Ωi of pixels in the first image, said pixels of the matrix surrounding the location i of a pixel of the security pattern image to insert into the first image,
- determining a characteristic level G(Ωi) of the pixels within the matrix Ωi and the texture level T(Ωi) of the matrix Ωi,
- modifying the characteristic level of a pixel of the first image at the location i of a pixel of the security pattern to insert, and surrounded by the matrix Ωi, by using a function F that takes into account the characteristic level G(Ωi) of the pixels within the matrix Ωi and the texture level T(Ωi) of the matrix,
- repeating the previous steps for each pixel of the security pattern image to insert into the first image.

The characteristic level can be one characteristic number for each pixel, this number representing for example one of the following: grey level, luminosity, red, green, blue, cyan, magenta, yellow, black. Thus, characteristic level may be either grey scale or color scales. In a well-working example, the characteristic level of the pixels within the matrix can be, but is not limited to, the average grey level of the matrix of pixels. Thus, by taking into account the texture level and the characteristic level of the neighboring pixels surrounding the target pixel of the security pattern to insert, the strength of insertion of the security pattern image in the first image is modulated, so that the global perception of the first image is improved and not disturbed by the inserted pattern image. The characteristic level, for example the grey scale, of each pixel of the inserted security pattern image being linked to the surrounding pixels of the first image by a function that is kept secret, it is impossible either to manufacture a completely falsified image or to fraudulently modify the first image without knowledge of this function.

The solution of the invention to the second technical problem relates to the fact that the method for securing an identification document comprises the steps of the method for securing a first image by a security pattern image and the identification image and its inserted security pattern image are printed simultaneously in only one step onto the identification document.

According to another aspect of the invention, there is provided a secure identification document having a printed identification image and a printed security pattern image, the security pattern image being inserted into the identification image, said images being defined by a plurality of pixels, characterized in that the characteristic level of each pixel i of the security pattern image is linked, by a function F, to a matrix Ωi of pixels defined in the identification image, said pixels of the matrix Ωi surrounding the location i of a pixel of the inserted security pattern, said function F taking into account the characteristic level G(Ωi) of the pixels within the matrix Ωi, and the texture level T(Ωi) of the matrix Ωi.

The solution of the invention to the third technical problem relates to the fact that the method comprises the following steps:

- determining, for each inserted pixel of the security pattern image, a matrix Ωi of pixels in the first image, surrounding the location i of said inserted pixel,
- running the algorithm computing the characteristic level $G'i_c$ of the pixel i by taking into account the characteristic level G(Ωi) of the pixels within the matrix Ωi, and the texture level T(Ωi) of the matrix,
- comparing the obtained result $G'i_c$ to the scanned characteristic level $G'i_r$ value of said inserted pixel,
- repeating the operations for all the pixels of the whole security pattern image and, depending whether the result of the comparison is within predetermined acceptable limits, rendering a verdict about the authenticity of the secure image.

BRIEF DESCRIPTION OF DRAWINGS

The invention will be better understood with reference to the drawings, in which.

DETAILED DESCRIPTION

Hereafter, an embodiment of the present invention will be described in the context of identity (ID) card and a method for producing it. However, it is to be understood that the invention is usable with any data carrier that includes, but is not limited to, a driving license, a badge or pass, a passport, a discount card, a membership card, a banking card, a credit card, a money card, a multi-application card, and other security documents and papers of value that are to be provided with information or data in such a way that they cannot be easily imitated by common means.

Figure 1:
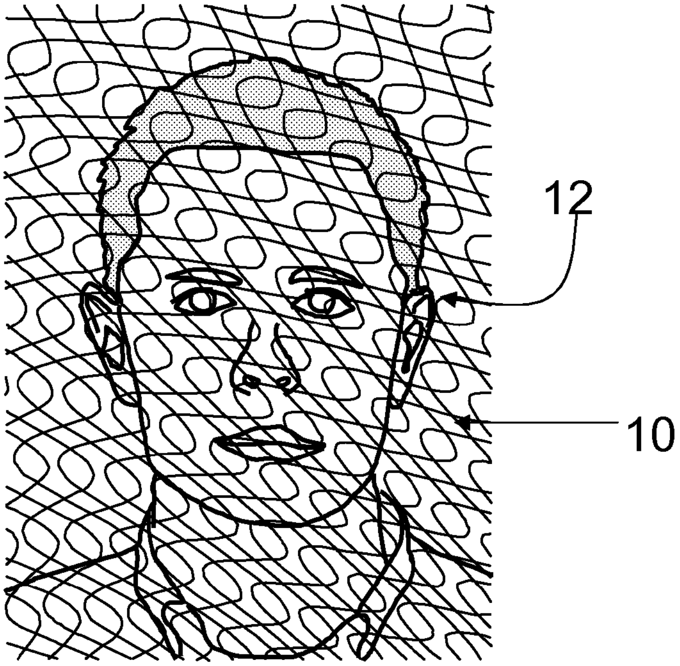
FIG. 1, already described, is a drawing of a combined image that includes a portrait image of an holder of an ID document and a security pattern image formed by a set of guilloche lines, FIG. 2, already described, is a schematic drawing showing an illustrative part of a first image that is changed in some pixels to insert a guilloche line according to a known method.
Figure 2:
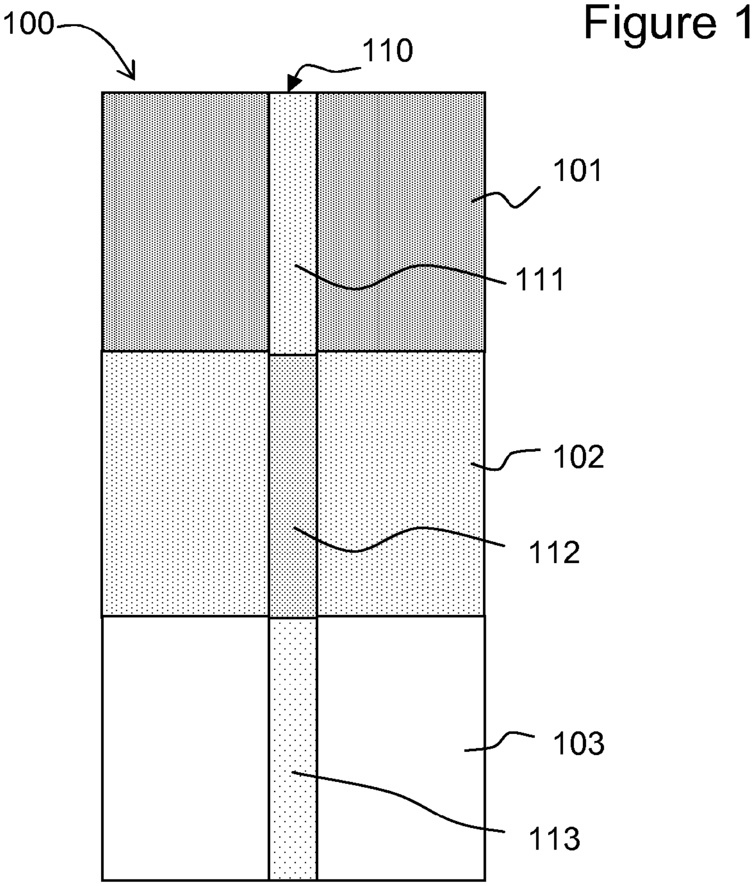

A security pattern image, such as guilloche lines, has to be resistant to image degradation while not affecting the perception of the first image, into which it is inserted. It has to be added as a perceivable and controlled additional layer to the first image. The first image is for example the photograph of the holder of the card. Human Visual System essentially results in the fact that each pixel value of an image can be changed only by a certain amount so as not to affect the image quality. This limit is called the "just noticeable distortion" or JND level. If the distortion of a pixel is not kept out of the limit defined by this JND level, the degradation of the pixel is imperceptible. The guilloche line has to be added as a perceivable additional layer into the original ID image without affecting the face recognition and perception. It is the necessary condition. The basic existing mechanism consisting in inversing the luminosity of the pattern, for each guilloche pixel into an image (already described in regards with FIG. 2), does not reach these two conflicting objectives. Human perception is not only based on gradient difference as it depends on the level of luminosity. Thus, for example, if an average grey level is around 20, in the neighborhood pixels, and if the target pixel at the location i is changed to 50, the perception will be very different than for an average grey level of 200, changed to 230, while the difference between the two values is of 30 and the same in the two cases. Consequently, the strength of insertion of the guilloche pixels at a given location has to be modulated according to the texture level and the luminosity of its neighborhood, in order to generate a set of rules. These rules allow determining a range of acceptable values. For each value, it becomes possible to estimate the level of perception.

Figure 3:
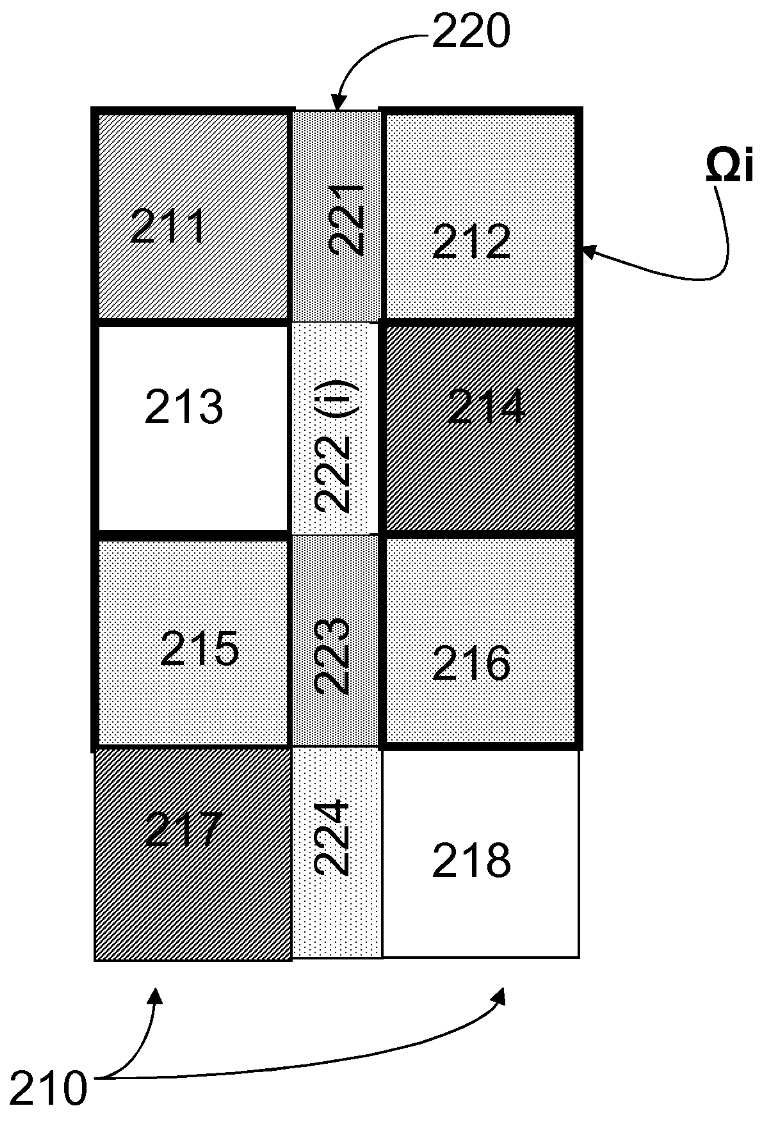
FIG. 3 is a drawing showing an illustrative part of a first image into which are inserted some pixels of a guilloche line according to a method of the present invention.
Figure 4:
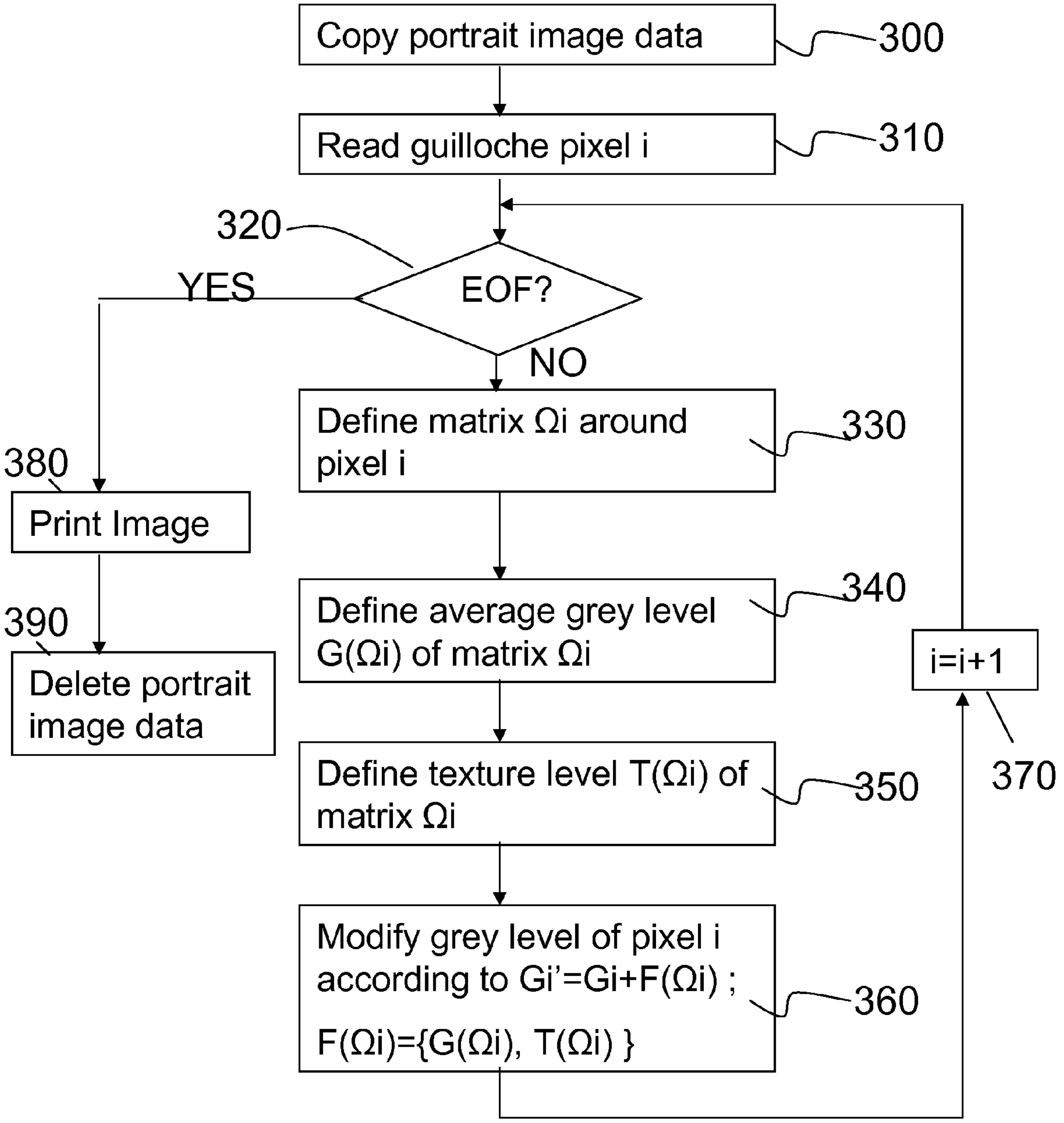
FIG. 4 is a flow diagram showing a sequence of steps for securing a first image by a security pattern image according to the invention.
Figure 5:
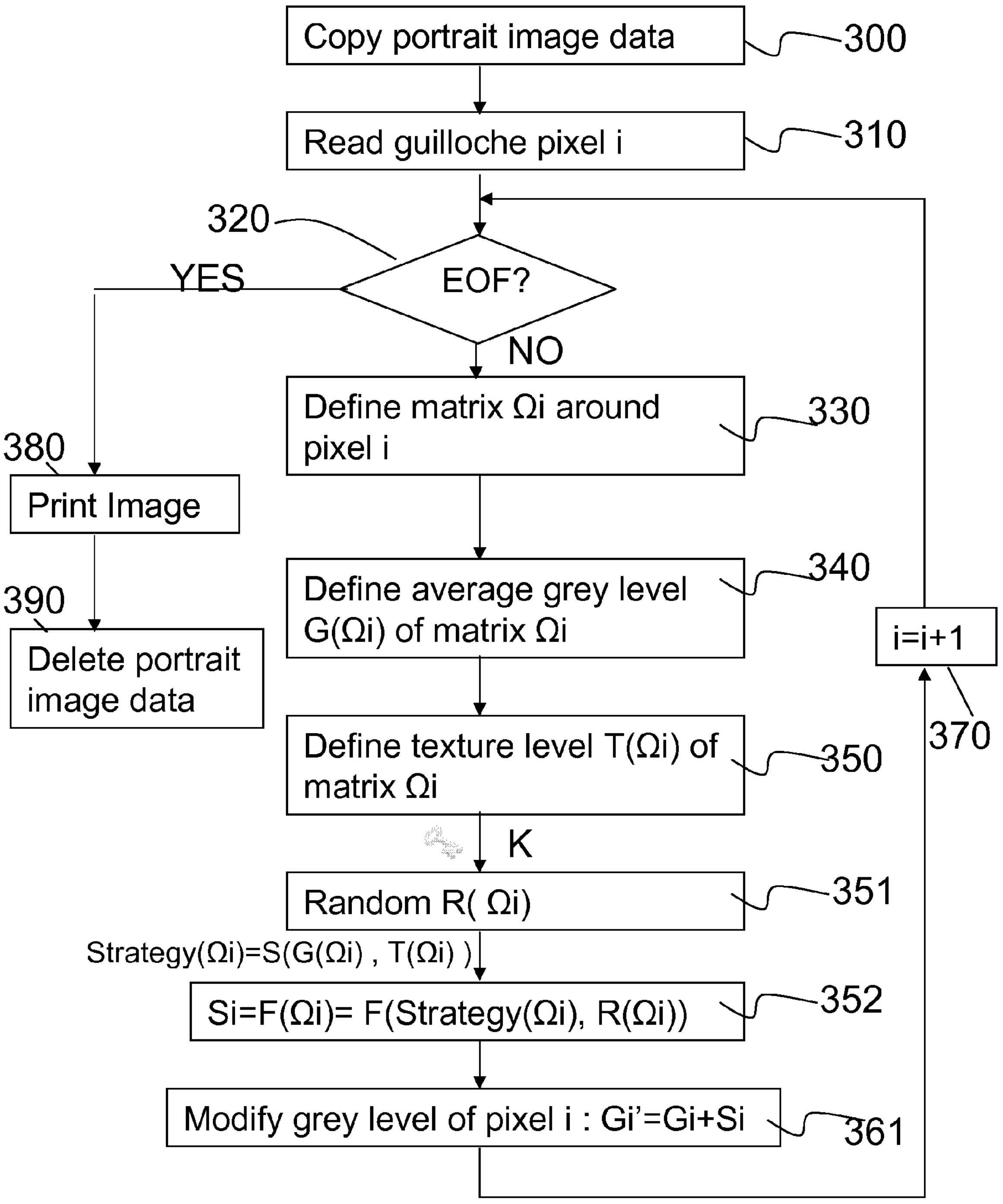
FIG. 5 is the flow diagram of FIG. 4 with additional optional steps for securing a first image by inserting a security pattern image.

FIG. 3 shows a schematic drawing of an illustrative part of a first image 210 into which is inserted a security pattern image 220 according to the invention. This figure will be explained together with FIG. 4 which is a flow diagram showing a sequence of steps for securing the first image 210 by the security pattern image 220. The first image 210 is for example the portrait image of the holder of an identification document, such as an ID card or a passport. In a first step of the securing process, a copy portrait image data step 300 consists in copying the portrait image data from a JPEG file to another file in a memory means of the personalization system to obtain a memorized copy of the portrait image. This first portrait image is defined by a plurality of pixels 211 to 218. The security pattern image 220, which has to be inserted into the first image, may be for example, but is not limited to, a guilloche line. This security pattern image 220 is also defined by a plurality of pixels 221 to 224. The insertion of this second image 220 into the first image consists in fact in modifying some pixels 221-224 of the first image 210 so that the second image 220 can be perceived into the first one. The modification may consist in reversing the luminosity of each pixel constituting the guilloche line 220. However, the insertion of the second image will alter the perception of the first image as both of them are required to be visible. Nevertheless, the degradation of the first image 210 by the insertion of the second image must be minimized. Indeed, the photograph for example must remain as well recognizable as possible as this is the main function of having the photograph on the document in the first place. In other words, the inserted pattern should not hide the image by having too dense a mesh of lines nor too high a contrast between the inserted pattern and the underlying original image. Consequently, the strength of insertion of the second image 220 into the first image 210 has to be controlled.

The next step 310 of the process consists in reading the next guilloche pixel from the guilloche lines image file, which is memorized in the personalization system. Then the sequence proceeds to an "EOF?" decision step 320, wherein the processor of the personalization system determines if the end-of-file of the guilloche lines image file has been reached. If it is determined in this decision step 320 that the end-of-file has not been reached, the personalization sequence next proceed to determine the strength of insertion of each pixel 221-224 of the guilloche lines 220 to be inserted in the portrait image 210, so that it becomes perceptible without altering the visual recognition of the first image 210.

For that, the strength of insertion of each pixel 221-224 of the guilloche line 220, in the first image, is modulated according to first, the luminosity, or for example the average grey level, and second, the texture level of a matrix Ωi of pixels surrounding the target pixel to insert, in order to generate a set of rules allowing the determination of a range of acceptable characteristic level values, such as grey level values in the illustrated examples. Consequently, next step 330 of the process consists in defining a matrix Ωi of XxY pixels around the location i of a guilloche pixel 222 to insert, but without this target guilloche pixel i. In the example illustrated in FIG. 3, the matrix Ωi, which is represented with thicker lines, comprises six pixels 211, 212, 213, 214, 215 and 216 of the first image, surrounding, but not comprising, the target pixel 222 at a location i. In the example of FIG. 3, the matrix comprises 3×3 pixels. In the printing field, images suffer of known "print and scan" attacks. Consequently, it is preferable to determine a matrix defining a small area around the target pixel, in order that the printing of the two images does not degrade too much the quality of the numeric images. Even if the matrix comprises two pixels surrounding the target pixel, this may work, but the results are less accurate than if the matrix contains 8×8 pixels for example. On other hand, the matrix must not contain too much pixels so as not to slow too much the time for image processing. In order to have a guilloche line which is visible in the first image but which does not alter the visual perception of this first image, not only the luminance but also the texture of the pixels of the matrix must be taken into account.

Each pixel 211-216 of the matrix Ωi has its own characteristic level, for example its own grey level, or its own luminance. For the determination of the characteristic level of the target pixel 222 at the location i, the characteristic level G(Ωi) of all the pixels within the matrix Ωi is computed at step 340. This characteristic level can be one characteristic number for each pixel, this number representing for example one of the following: grey level, luminosity, red, green, blue, cyan, magenta, yellow, black. Thus, characteristic level may be either grey scale, or color scales or parameterization of color images. In a well-working example, as illustrated in the FIGS. 3 and 4, the characteristic level of the pixels within the matrix can be, but is not limited to, the average grey level of the matrix of pixels. The average texture level T(Ωi) of the matrix Ωi is also determined at step 350. The texture is defined, in the field of imaging, as being a mix of different colors or black, grey and white colors that give the impression the image is more or less uniform. If the image appears not to be uniform, as the hair for example, it is defined as being textured, on the contrary if it appears to be uniform, it is not textured. Considering this definition, it is possible to define levels of texture, for example four levels of texture, in which a level D will be defined as the more textured, while a level A will be defined as the less textured, for example. If photography has very textured area, such as hair for example, the texture level has to be taken into account, in order that the inserted pixel 222 of the guilloche line, at the location i, becomes perceptible to human eye.

The order of these steps 340 and 350 of definition of the characteristic level and texture level of the matrix does not matter; it can be indifferently reversed without disturbing the process.

The strength of insertion at a given location is modulated according to the texture level and the luminosity of its neighborhood, in order to generate a set of rules. These rules allow determining a range of acceptable values. For each value, it is possible to estimate the level of perception. It is technically possible to define a function F, which takes as input the neighborhood characteristic levels G(Ωi) (for example grey levels 0 to 255) and texture levels T(Ωi) (for example from A to D), and provides as output admissible characteristic levels for each guilloche pixel (for example a grey level from 180 to 255 and from 0 to 80) and for each of these admissible levels, a level of perception for human eye (a strength from 1 to 5 for example).

Then, after having defined the characteristic level, for example the average grey level G(Ωi), and the texture level T(Ωi) of the matrix Ωi, a function F, which is kept secret and which takes as input the defined values G(Ωi) and T(Ωi), can be used to compute the modification of the characteristic level Gi' of the target pixel i of a guilloche line compare to its original characteristic level Gi, so that it becomes perceptible into the first image without disturbing the recognition of the first image. This computation is made at step 360.

For defining the function F, it is possible to use fuzzy logic using a data base of a representative number of all possible matrixes Ωi in combination with all guilloche patterns having a uniform grey level. The data base may store for each matrix Ωi several information: the average grey level G(Ωi), a textured parameter T(Ωi), a guilloche grey level Gi(Ωi), and a visual perception parameter S(Ωi). The textured parameter T(Ωi) is computed on the matrix Ωi and may correspond, for example, to the variance of grey level in the matrix Ωi. In another example, the textured parameter T(Ωi) may correspond to a means of second to seventh rank of Fourier transform of the matrix Ωi. The visual perception parameter S(Ωi) is determined with a panel of people who indicate a level of perception of the guilloche into the matrix, as an example 1 corresponding to "not perceptible" and 5 corresponding to "very perceptible".

The data base being defined, a combination according fuzzy logic methods can be performed for determining the level of the pixel Gi(Ωi) of the corresponding matrix Ωi. This is made by combining the different guilloche grey levels of the data base of matrix Ωi having same average grey level G(Ωi), same or near the same textured parameter T(Ωi) and a same level of perception S(Ωi).

It is also possible to have separation of the database in two parts, one for additive grey level for guilloche and the other one for subtractive grey level for guilloche. With such a method of computation of function F, the secrecy of the function F resides in the secrecy of the data base.

Then, the characteristic level, i.e the grey level in the illustrated example, of the guilloche pixel 222 at the location i in the portrait image data 210 is modified, so that the guilloche pixel becomes visible without altering the perception of the photograph 210. The steps of the sequence thus described are repeated for each pixel of the guilloche lines image file until the end-of-file has been reached. Then, the identification image and the inserted security pattern are printed simultaneously in only one step (step 380) and the portrait image data file is deleted from the memory means of the personalization system (step 390).

In a variant, it is also possible to take into account, as inputs of the secret function F, some customer's expectations. Thus, the customer may expect that the strength of insertion depends on the location in the photograph. For example, he may want a weak insertion for the guilloche at the center of the face, and a strong one all around the center of the face, weak and strong representing the insertion strength, i.e it can be more or less visible but always without affecting the recognition of the face.

The thus described embodiment enables to do a first visual inspection very quickly, because the same security pattern can be used to secure ID images of all types of documents. Then, a second verification can be made by using a dedicated reader having an appropriate algorithm in order to verify that the inserted security pattern is made with the true acceptable characteristic level, i.e the true acceptable grey scale in the illustrated example.

Another embodiment of the personalization process and the securing of the first image consists in adding facultative steps rendering counterfeiting even more difficult. The first embodiment that has been described only relies on the non trivial dependence on the neighborhood pixels. In this second embodiment facultative extra steps 351, 352 and 361 are added.

After having defined the texture level T(Ωi) of the matrix Ωi, an additional step 351 consists in applying a mask on the texture level, by using a secret key K and a secret encryption algorithm, in order to provide a random R(Ωi). This extra step enables to select one solution of representation amongst a plurality of possibilities, and to fill a degree of freedom, by using a secret algorithm, which depends on the neighborhood pixels.

A further extra step 352, consists in computing a strength parameter Si, by taking into account the Random value R(Ωi), which has been computed, and a Strategy value S(Ωi). The Strategy value S(Ωi) is defined by the necessary conditions on a range of acceptable characteristic level values to obtain a perceptible result (i.e. G(Ωi) and T(Ωi)) and optionally the customers expectations. This parameter S(Ωi) is preferably predetermined and kept secret in a storage area, such as, but not limited to, a memory or a database.

At step 361, the characteristic level, i.e the grey level in the illustrated example, of the original image at the location i of the target guilloche pixel is modified according to function Gi'=Gi+Si, where Gi' is the modified grey level of the pixel i, Gi is the original grey level of the pixel i in the first image, and Si =F(Strategy (Ωi), Random (Ωi)).

To be perceptible "nice", some image processing optimizations are needed to improve the global perception (particularly the continuity) of the guilloches in the final image. The Random part is not computed pixel per pixel but zones by zones (i.e. the matrix Ωi). The image has to be cut in small zones of some pixels where the behavior has to be substantially similar. The strategy imposes some constraints for the guilloche, and takes also into account possible expectations for the customer. Thus, a guilloche line may be for example weak at the center of the face while it is stronger outside toward the edges of the photo. A combination of the strategy and the random part provides a visible guilloche, which becomes difficult to reproduce, particularly when the artwork is not uniform.

Figure 6:
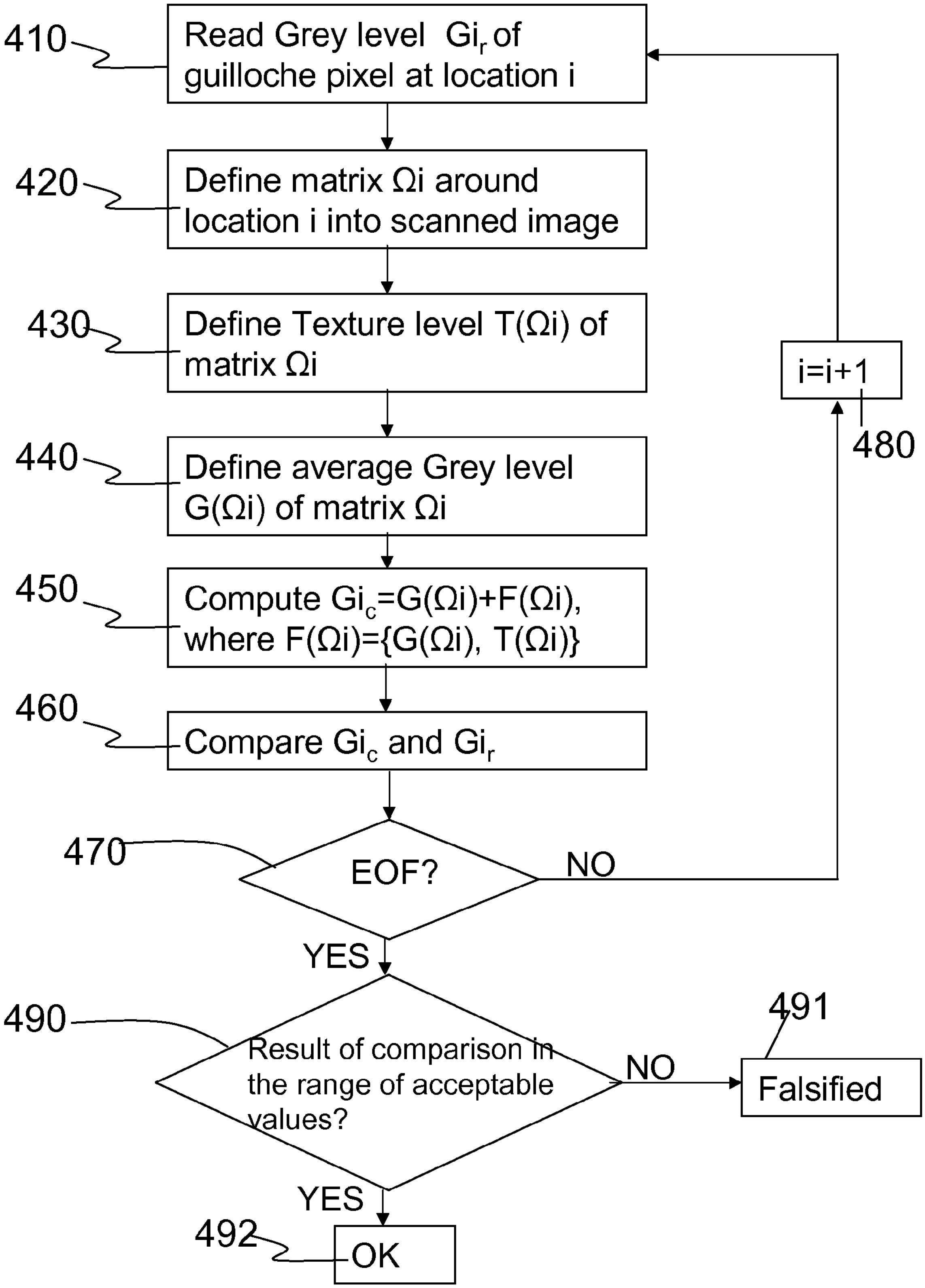
FIG. 6 is a flow diagram showing a sequence of steps for verifying the authenticity of an image that has been secured according to the invention.

Upon document authentication (see flow chart of FIG. 6), a specific reader is used to detect (step 420) the matrix Ωi of XxY pixels in the first image; around the location i of each guilloche pixel, to run the algorithm above (steps 430-450), and to compare (step 460) the result obtained in computation step 450 to the scanned characteristic level value (i.e. the grey level value in the illustrated example) of each guilloche pixels (step 410). If the comparison is within the pre-determined range of acceptable values (step 490-492) for the whole guilloche, the personalization is considered authentic (step 492). If not, it is considered falsified (step 491). The comparison is made pixel by pixel, but the result on the authentication is rendered after having made the comparison on the pixels of the whole security pattern.

The reader used for the authentication comprises a scanner device, which may be, but not limited to, a scanner or a camera or a mobile phone equipped with such camera etc. The scanned image must be of high resolution enough in order to be able to analyze all the pixels. Then the reader must also comprise computing means for analyzing the scanned pixels. The computation of the characteristic level $Gi_c$ (i.e. computed grey level in the example) of a pixel i of the inserted guilloche is made from the average grey level G(Ωi) of the matrix, and by using the secret function F(Ωi).

The characteristic level, such as the grey scale, of the guilloche pixels can be formed quite generically as a weighted sum of the neighbouring pixels. The weights can depend on many factors such as the grey levels, or other color levels, the texture in the image close to the guilloche, the knowledge of the human vision system (eyes+brain), etc. The function F can be held secret either in the reader, or in a remote server, or in a memory of a chip on the ID document, etc.

The thus described embodiments increase the security of identification documents and prevent either their modification or the manufacturing of a completely falsified document.

The invention claimed is:

1. A secure identification document comprising a printed identification image and a printed security pattern image, the security pattern image being inserted into and simultaneously printed in one step with said identification image, each image being defined by a plurality of pixels, the characteristic level of each pixel i of the security pattern image being linked, by a function F, to a matrix Ωi of pixels defined in the identification image, said pixels of the matrix Ωi surrounding the location i of a pixel of the security pattern image to insert, said function F taking into account the characteristic level G(Ωi) of the pixels within the matrix Ωi and the texture level T(Ωi) of said matrix Ωi.

2. A method for securing a first image by a security pattern image overlapping the first image, wherein each image is defined by a plurality of pixels, the method comprising:

defining a matrix Ωi of pixels in the first image, said pixels of the matrix surrounding the location i of a pixel of the security pattern image to insert into the first image, determining a characteristic level G(Ωi) of the pixels within the matrix Ωi and the texture level T(Ωi) of the matrix Ωi, modifying the characteristic level of a pixel of the first image at the location i of a pixel of the security pattern to insert, and surrounded by the matrix Ωi, by using a function F that takes into account the characteristic level G(Ωi) of the pixels within the matrix Ωi and the texture level T(Ωi) of the matrix, repeating the previous steps for each pixel of the security pattern image to insert into the first image, and printing simultaneously in only one step the identification image and its inserted security pattern image.

3. A method according to claim 2, wherein the function F is kept secret in a storage area.

4. A method according to claim 2, further comprising applying a mask on the texture level T(Ωi) of the matrix Ωi, by using a secret key K and a secret encryption algorithm, in order to provide a random RΩi).

5. A method for verifying the authenticity of an image secured using a security pattern image according to the method of claim 2, further comprising:

defining a matrix Ωi of pixels in the first image, said pixels of the matrix surrounding the location i of a pixel of the inserted security pattern image, determining the characteristic level G(Ωi) of the pixels within the matrix Ωi and the texture level T(Ωi) of the matrix Ωi, computing the characteristic level $Gi_c$ of a pixel of the inserted security pattern at the location i, surrounded by the matrix Ωi, by using a function F that takes into account characteristic level G(Ωi) of the pixels within the matrix Ωi and the texture level T(Ωi) of the matrix Ωi, comparing the computed characteristic level $Gi_c$ of the pixel at the location i with the read characteristic level $Gi_r$ of the scanned pixel at the same location i, repeating the preceding steps for each pixel of the inserted security pattern, and rendering a authentication's result after having made the comparison on the pixels of the whole security pattern.

* * * * *